Feb. 22, 1955 M. D. PETERS 2,702,481
COLLAPSIBLE LINKAGE APPARATUS
Filed May 17, 1951 7 Sheets-Sheet 1

INVENTOR.
MAX D. PETERS
BY
*George H Fisher*
ATTORNEY

Feb. 22, 1955 M. D. PETERS 2,702,481
COLLAPSIBLE LINKAGE APPARATUS
Filed May 17, 1951 7 Sheets-Sheet 2

INVENTOR.
MAX D. PETERS
BY
George H Fisher
ATTORNEY.

Feb. 22, 1955     M. D. PETERS     2,702,481
COLLAPSIBLE LINKAGE APPARATUS

Filed May 17, 1951     7 Sheets-Sheet 3

FIG. 3

INVENTOR.
MAX D. PETERS

BY

*George H Fisher*

ATTORNEY.

INVENTOR.
MAX D. PETERS
BY
George H Fisher
ATTORNEY

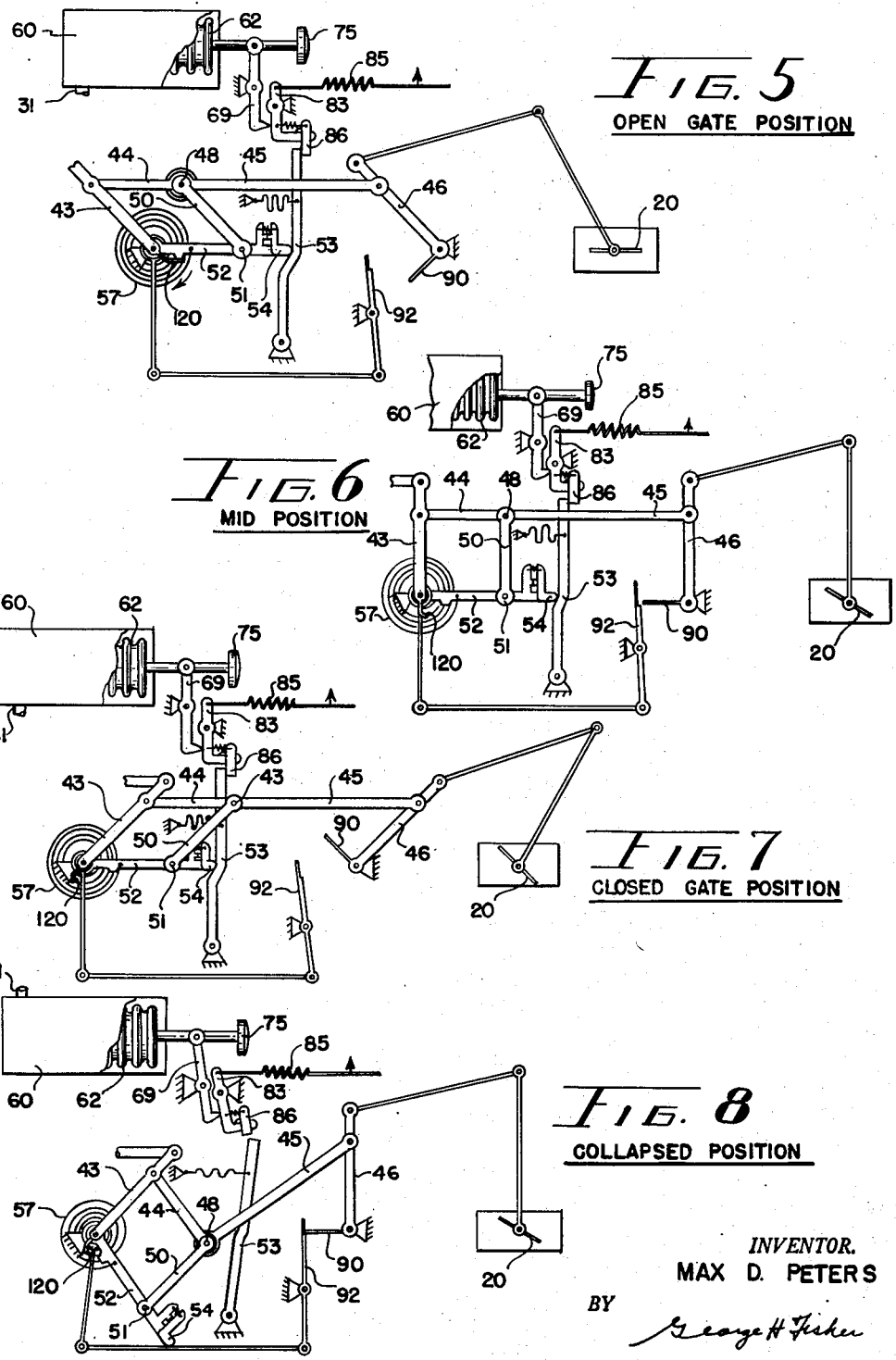

Feb. 22, 1955 M. D. PETERS 2,702,481
COLLAPSIBLE LINKAGE APPARATUS
Filed May 17, 1951
FIG. 9
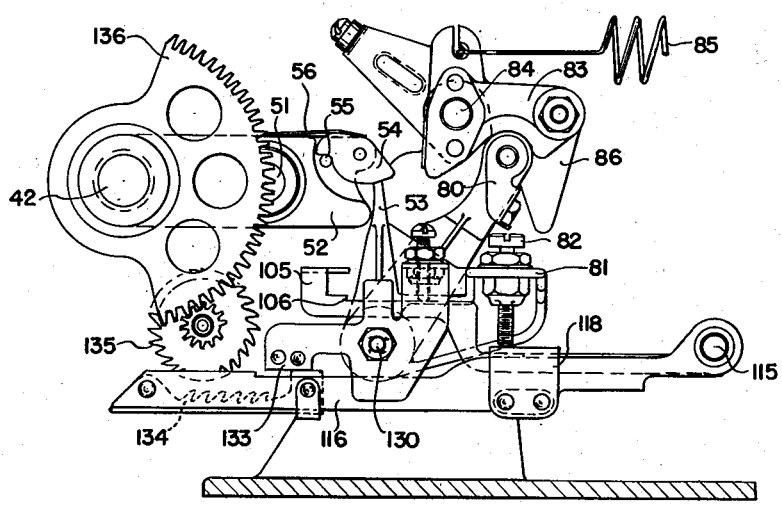
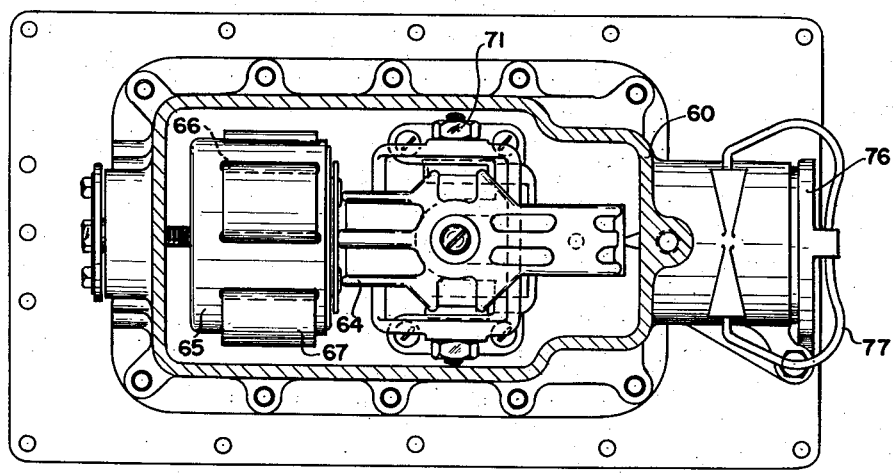
FIG. 10
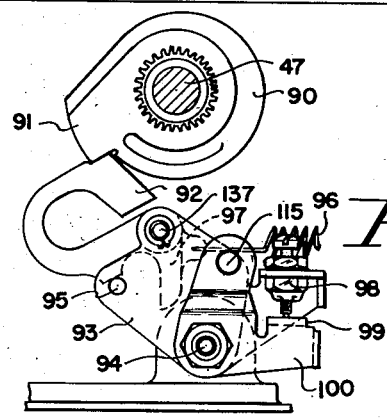
FIG. 11
INVENTOR.
MAX D. PETERS
BY
*George H Fisher*
ATTORNEY.

INVENTOR.
MAX D. PETERS
BY George H Fisher
ATTORNEY

United States Patent Office 2,702,481
Patented Feb. 22, 1955

1

2,702,481

COLLAPSIBLE LINKAGE APPARATUS

Max D. Peters, Richfield, Minn., assignor to Minneapolis-Honeywell Regulator Company, Minneapolis, Minn., a corporation of Delaware Application May 17, 1951, Serial No. 226,873

13 Claims. (Cl. 74—2)

The present invention is concerned with an improved protective apparatus wherein it is desirable to disrupt a driving connection between a driving member and a driven member and to move the driven member to a predetermined fixed position. More specifically, the present invention is concerned with a protective apparatus for establishing a driving connection between a waste gate motor and a turbo supercharger system and a waste gate wherein the connection will be disrupted upon the occurrence of a condition requiring limiting with means for driving the waste gate to a predetermined position and for relatching the system with a minimum of effort.

Many types of high powered combustion engines are provided with turbo superchargers for supplying air at high pressures to the engines so that maximum power may be obtained therefrom. The driving energy for the superchargers is often obtained from the flow of exhaust gases from the engine. To control the operation of the turbines of such superchargers, a waste gate is often provided which may be used to divert the flow of the gases around the turbine. This waste gate may be controlled by any suitable control apparatus which may be of the type shown in Letters Patent of Alex B. Chudyk, entitled "Pressure Control Apparatus Having Limiting Controller," #2,629,074, issued February 17, 1953.

As excessive pressures on the engine intake may cause damage to the engine, it is necessary to provide some protective apparatus to insure that the pressure is limited to a predetermined safe value. An apparatus for protecting the apparatus against excessive pressures is shown in a Udale patent, 2,312,283, for "Power Control," issued March 9, 1943. The Udale apparatus provides a system wherein a pair of connecting links between a throttle and a throttle adjusting lever may be moved to an inoperative position and the throttle closed upon the occurrence of an excessive manifold pressure. The Udale apparatus, however, is not readily adapted to use with a waste gate wherein the resetting of the apparatus when tripped must be done by remotely operated means and wherein adjustment of the apparatus to determine the tripped position can be readily made. Further, the Udale apparatus is not readily adapted for mounting in a small space to still accomplish the function desired. Still further, it is desirable to separate the tripping function of the apparatus from the electrical system to prevent momentary power failures from affecting operation of the apparatus when not needed.

In a copending application of Randolph E. Divette, entitled "Protective Apparatus," Serial No. 226,903 filed May 17, 1951, there is shown and claimed the basic linkage system which is incorporated in the present invention. The present invention is directed to the provision of means for latching the linkage when collapsed in a fixed position and providing a relatching mechanism which requires a minimum of effort to relatch the apparatus from the collapsed position.

It is therefore an object of the present invention to provide a new and improved protective apparatus wherein a coupling between a driven member and a driving member is interrupted and the driven member is caused to assume a predetermined position.

Another object of the present invention is to provide an improved protective apparatus wherein a collapsible linkage is connected between a driven member and a driving member, and whenever a simple relatching means is provided to put the apparatus in an operating position following collapse thereon.

2

Still another object of the present invention is to provide an improved collapsible connecting linkage between a driven member and a driving member wherein a maximum collapsing force may be applied to the linkage and the linkage is driven to a predetermined position whereupon the linkage may be reset with a minimum of force.

A further object of the present invention is to provide a collapsible linkage between a driven member and a driving member where the linkage is maintained in an operative position by a latch means which is effective when released to actuate stop means to a predetermined position to lock the linkage in a fixed position as concerns the driven member.

A still further object of the present invention is to provide a collapsible linkage between a driven member and a driving member when the linkage following the collapse to a predetermined position is reset by a member acting through the driving member.

These and other objects of the present invention will be understood upon considering the following specification and drawings of which:

Figure 3 is a view taken from the side opposite that of Figure 2;

Figure 12:
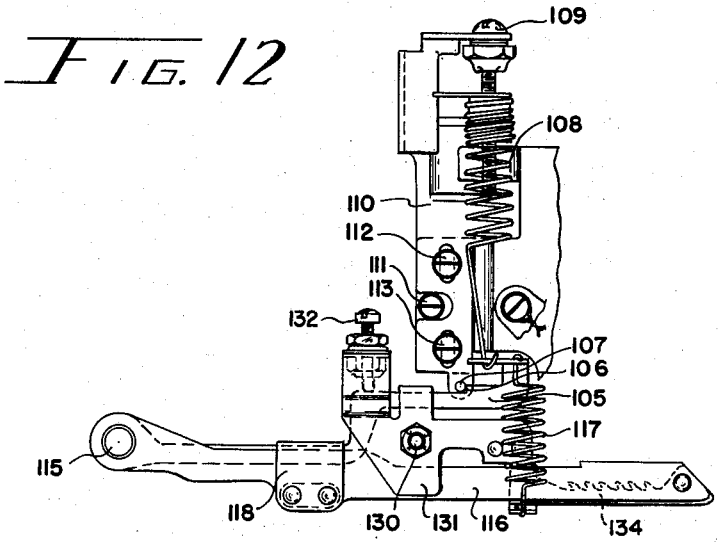

Figures 5, 6, 7, and 8 show schematically the outline of the linkage system in various positions of operation;

Figure 9 shows a section of the tripping mechanism of the apparatus;

Figure 10 shows a top view of the pressure responsive portion of the apparatus and the manual trip portion of the apparatus;

Figure 11 shows a mechanism for locking the output arm of the apparatus in a predetermined position;

Figure 12 shows a portion of the tripping mechanism; and

Figure 13:
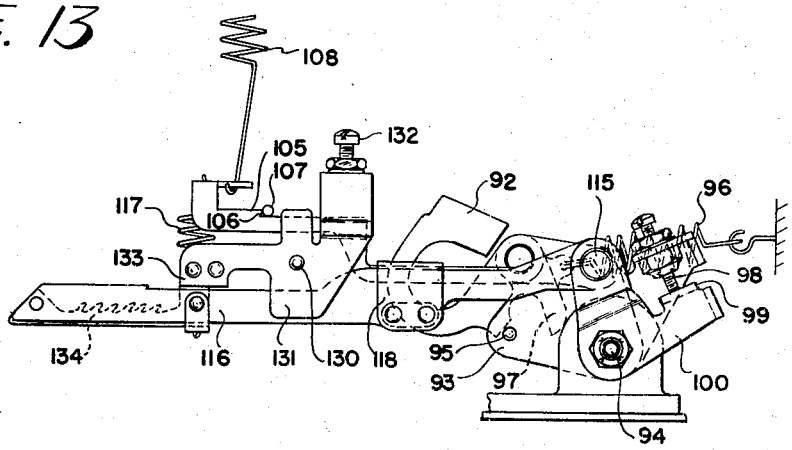

Figure 13 shows a view of the tripping mechanism taken from a side opposite the side shown in Figure 12.

Figure 1:
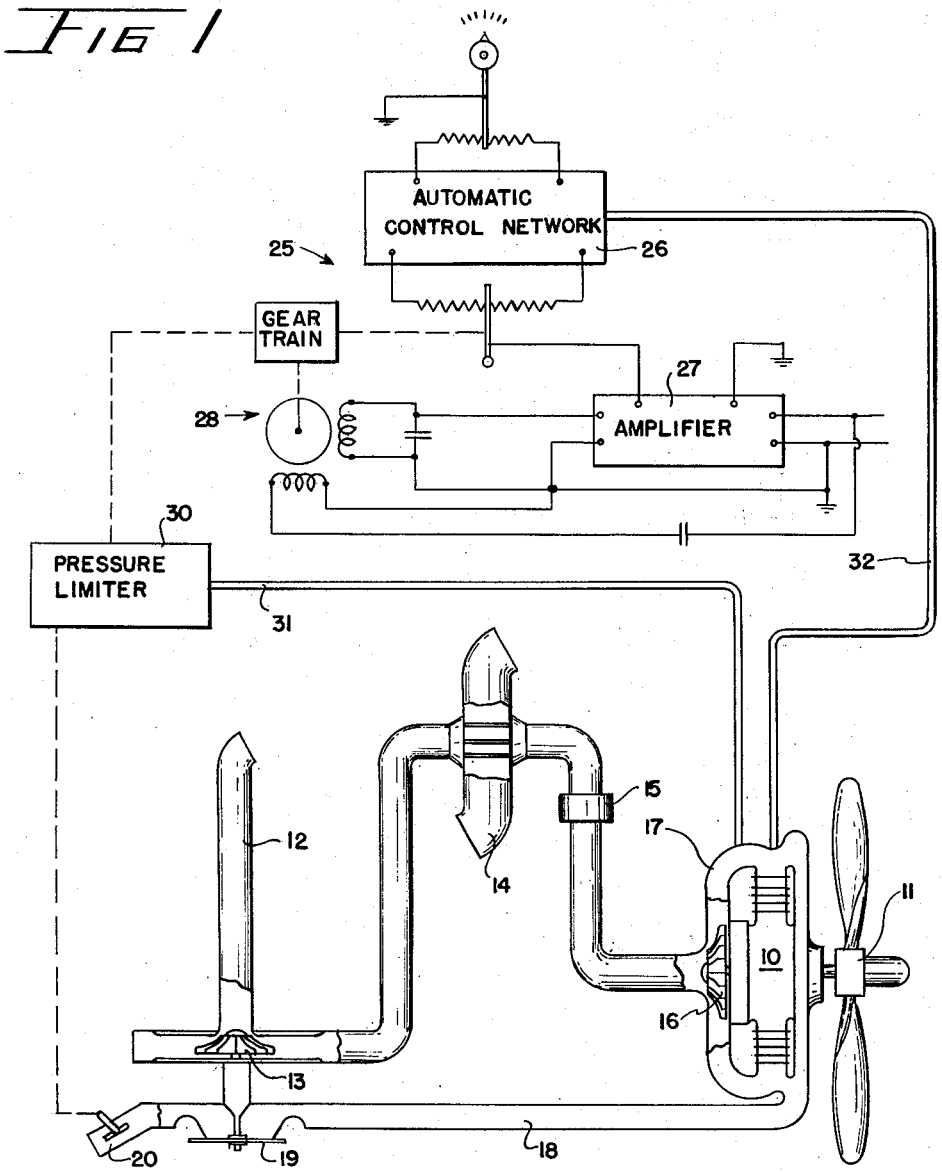
Figure 1 is a diagrammatic showing of a turbo supercharger control system of an internal combustion engine with the present invention shown in its normal connection into the system.

Referring first to Figure 1, the numeral 10 represents a combustion engine which is shown to be driving a propeller 11. Air for the intake of the engine is supplied through an intake conduit 12 where the same is drawn by a compressor 13. The compressor 13 forces the air under pressure through an intercooler 14 and a carburetor 15 to a direct driven compressor 16 which is arranged to be driven by the engine 10. The compressor 16 further compresses the air and the same is supplied to the intake manifold 17 of the engine 10.

The products of combustion or the exhaust gases from the engine 10 are fed through a conduit 18 to a turbine 19 which is connected in driving relation to the compressor 13. The exhaust gases from the exhaust conduit 18 expanding through the turbine 19 drive the same and in turn drive the compressor 13. Controlling of the flow of gases through the turbine is by a waste gate 20, the gate when in the open position bypassing the gases around the turbine 19 and when in the closed position causing all of the gases to flow through the turbine 19 to thus vary the speed of the turbine 19 when moved between the two positions.

The controlling of the position at the waste gate 20 is accomplished by an automatic controlling apparatus indicated generally by the numeral 25. This control apparatus includes an automatic control network 26 of the balanceable electric type, and a balancing detecting device in the form of an amplifier 27, and a motor 28 which is adapted to be reversibly driven by the amplifier 27. The output of the motor 28 is fed through a pressure limiter 30 to the waste gate 20. The pressure sensed by the pressure limiter is fed from the intake manifold 17 through a conduit 31 while the pressure sensed by the automatic control network is fed thereto through a conduit 32.

For a complete understanding of the automatic control apparatus of Figure 1, reference should be made to the above mentioned Alex B. Chudyk Patent #2,629,074. For purposes of explanation here, it should be understood that unbalance signals appearing in the network 26 due to a change in manifold pressure or due to a manual adjustment of the network will be detected by the amplifier 27. Amplifier 27 will be, in turn, controlling the operation of the waste gate motor 28 and causing rotation thereof in one direction or the other depending upon the direction of unbalance of the network 26. The motor 28 operating through the pressure limiter will open or close the waste gate to decrease or increase the speed of the turbine 19 and the compressing effect of the compressor 13 in order to cause the intake manifold pressure to assume a desired value. In the event the intake manifold pressure is higher than a predetermined safe value, it is desired that the pressure limiter 30 be effective to break the driving connection between the motor 28 and the waste gate 20 and to move the waste gate 20 to a predetermined safe position such that the pressure in the intake manifold will be reduced to a safe value.

Figure 2:
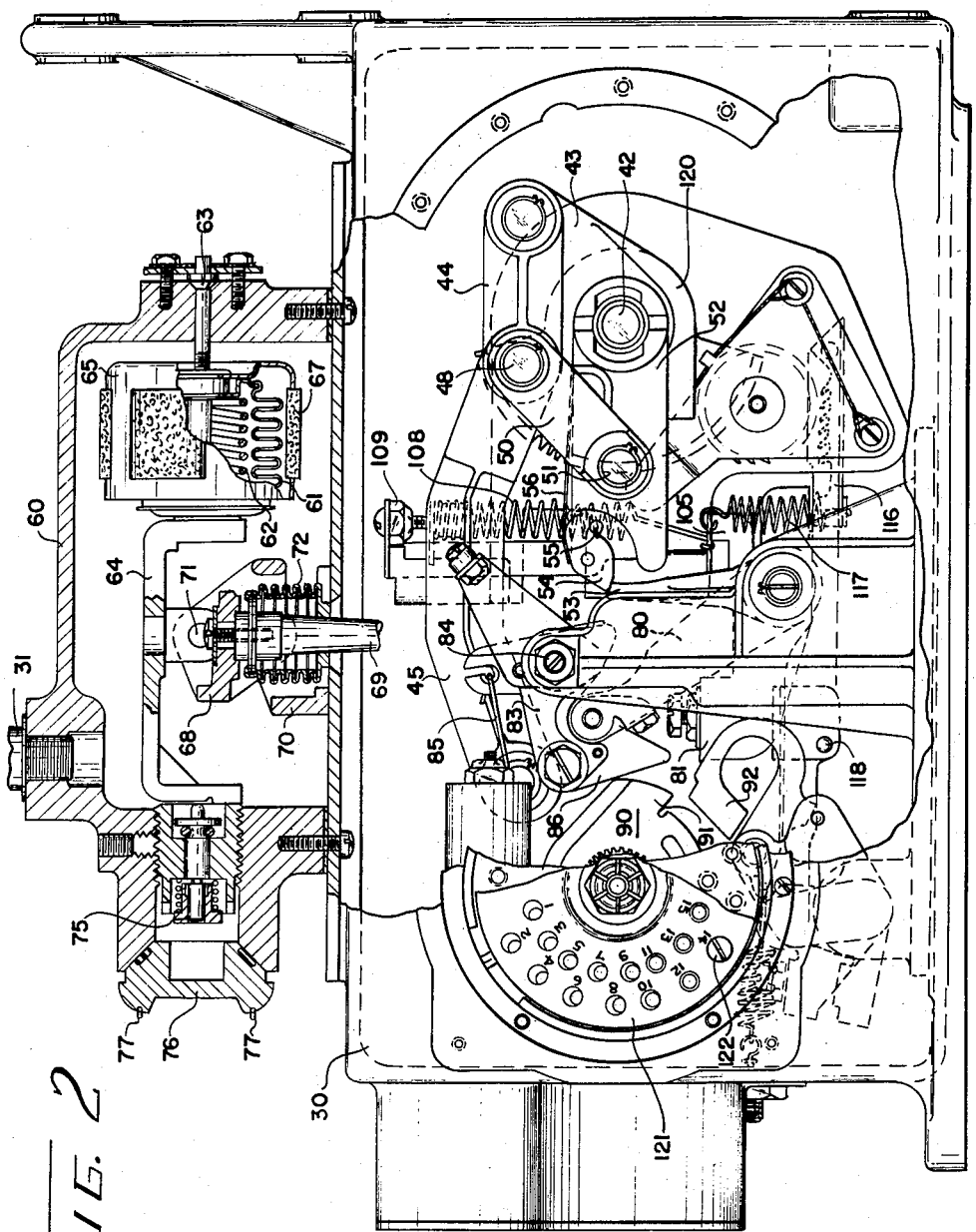
Figure 2 is a side view of one form of the invention with portions thereof cut away to show the linkage mechanism.
Figure 4:
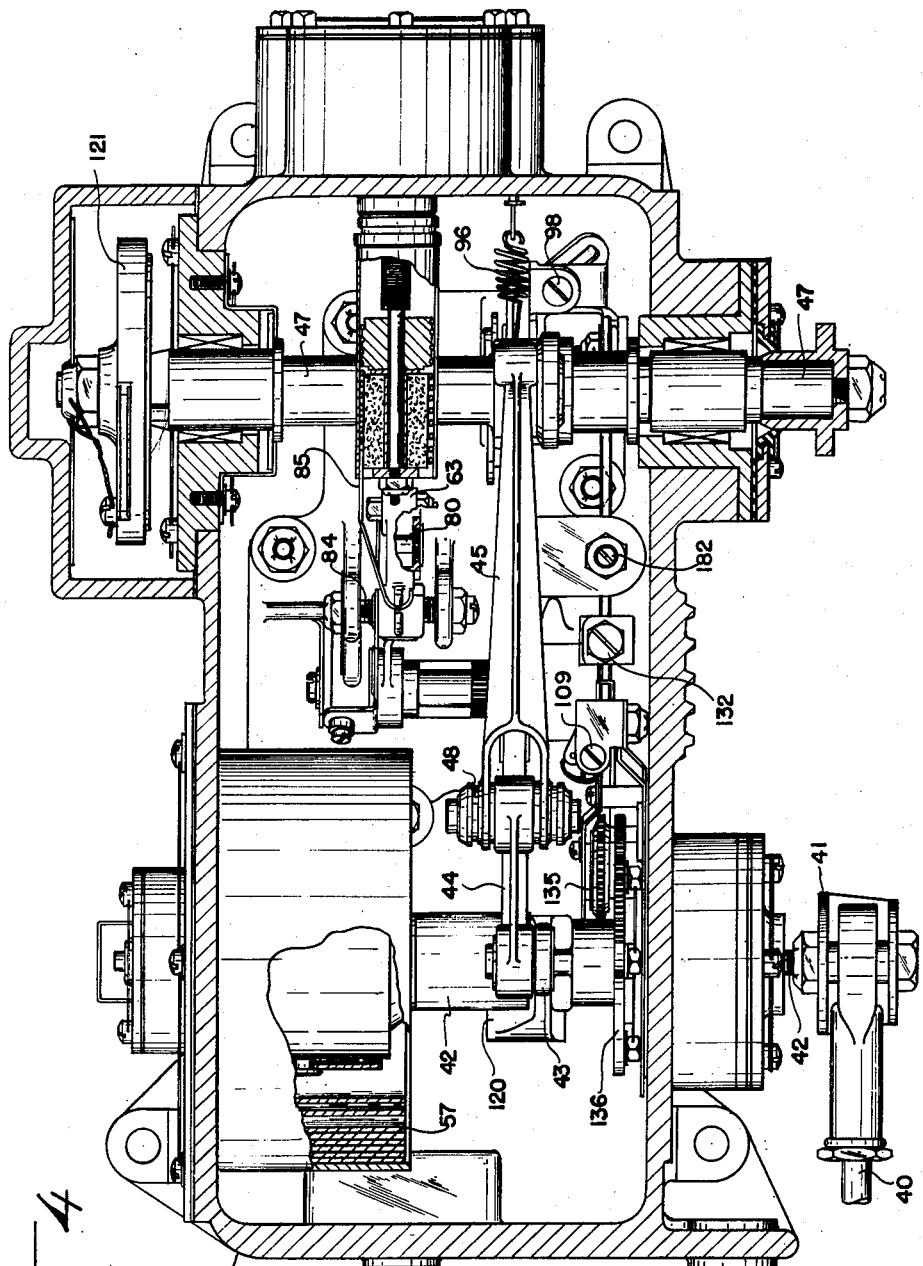
Figure 4 is a top view of the linkage apparatus with the pressure responsive control shown in Figures 2 and 3 removed.

Referring now to Figures 2, 3, and 4, the pressure limiting apparatus 30 is shown with portions of the housing removed. A driving connection is established through a link 40, shown in Figure 4, said link connecting through a bell crank 41 which is attached to a driving shaft 42, the latter shown in Figures 2 and 3. Within the apparatus is an input driving arm 43 which is rigidly attached to the shaft 42. Pivotally connected to the other end of the driving arm 43 is an input arm link 44. This link 44 also connects to an input arm link 45 by a pivoting means 48. Link 45 is connected to an output arm or driven arm 46 which is rigidly attached to the output shaft 47 and which is normally connected by means of a lever arm, not shown, to the waste gate 20, of Figure 1.

Supporting the pivot 48 and maintaining this pivot in axial alignment with the ends of the links 44 and 45 is a torque arm link 50 which is pivoted at 48 and is also pivoted at 51 on a torque arm 52. This torque arm 52 is pivotally mounted on the output shaft 42 and is rigidly held in position by a latch 53 which engages a torque arm nose member 54, the latter of which is pivotally mounted on the end of the torque arm 52 and is biased against a pin 55 by a blade type spring 56. The torque arm 52 is biased against the latch 53 by a torque spring 57, shown in Figure 4, which is of the spiral type and is movable about the input shaft 42.

Under normal operation, the apparatus set forth thus far forms an operative driving connection between the input shaft 42 and the output shaft 47. Referring to Figures 5, 6, and 7, the schematic showing of the parts in the various modes of operation will facilitate an understanding of the apparatus set forth thus far. In these figures, the parts corresponding to those of Figures 2, 3 and 4 carry the same reference numerals. It should also be noted that instead of operating through the input shafts and output shafts as shown in the basic figures, the driving connections to the input arm 43 is shown to be direct as is the output connection from output arm 46 to the waste gate 20.

Figure 5 shows the apparatus in the open waste gate position, that is the position in which the exhaust gases will be bypassed around the turbine 19 in Figure 1. It will be noted that the arms 43 and 52 with the links 44 and 50 form a parallelogram and since the respective pivot points are in alignment with those of the output arm 46, the ratio of movement of the input arm with respect to the output arm will be 1 to 1. Figure 5 also shows how the torque spring 57 acts upon the torque arm 52 to bias the same through the nose member 54 against the latch member 53. As the torque spring acts only on the torque arm 52, the spring will not interfere with the positioning of the other members of the apparatus. Thus, when the apparatus is moved to the mid-position as shown upon Figure 6, the input arm 43 and the output arm 46 will rotate in a clockwise direction as shown upon the figure as will the connecting link 50. This clockwise movement of the arms 43 and 46 will cause a corresponding adjustment of the waste gate 20 continued clockwise rotation of the input arm 43 will cause a corresponding rotation of the output arm 46 and when moved far enough the waste gate will be moved to the closed position as is shown in Figure 7. It will thus be seen that in Figures 5, 6 and 7 that when the apparatus is in the latched up position as it is shown in these figures, movement of the input arm 43 will cause a corresponding movement of the output arm and, as far as the waste gate is concerned, the input arm is directly connected to the waste gate.

Considering next the pressure responsive portion of the apparatus, reference should be made to Figure 2 where the apparatus is shown in side view and to Figure 10 where the apparatus is shown viewed from the top. A housing 60 surrounds the pressure sensing apparatus and forms a sealed chamber with air supplied thereto through the intake conduit 31 from the intake manifold 17, shown in Figure 1. Inside the housing 60 is a pressure responsive bellows 61 which is evacuated and has a biasing spring 62 mounted therein, said bellows responding to absolute pressure. The right end of the bellows, as shown in Figure 2, is carried by an adjustable screw 63 and the left end is operatively connected to a connecting member 64 which is arranged for movement along the central axis of the bellows 61. The bellows 61 is surrounded by a cup-shaped cover member 65 which has a plurality of slots 66 cut longitudinally in the sides thereof. Threaded through these slots slots is a felt padding 67 which serves to prevent lateral displacement of the bellows 61 and to protect the bellows from damage which might result from vibrating tendencies of the bellows and the resultant striking of the bellows on the side of the cover member 65.

The connecting member 64 is pivotally connected to a trip arm carrier 68, the latter of which has a trip arm 69 rigidly attached thereto. The carrier 68 is pivotally mounted on a member 70 and is pivoted with respect to member 64 at 71 so that axial movement of connecting member 64 will cause a rotational movement of the carrier member 68 and the trip arm 69. A seal-off bellows 72 separates the interior of housing 60 from that of housing 30.

A manual actuator for connecting member 64 is indicated at 75, this actuator being located under a removable sealing cap 76, the latter of which is held in position by a pair of spring clamps 77. When there is an increase in the pressure in the housing 60, the bellows 61 will collapse and move to the right, as viewed in Figure 2, and this will result in clockwise movement of the trip arm 69.

Considering next the latch 53 and the releasing mechanism therefore, reference should be made to Figures 2, 3, and 9. The latch 53 is one part of a single member which includes a latch holding arm 80 and a trip actuator 81. The trip actuator 81 has an adjustable screw 82 carried thereby which operates in a manner to be explained hereinafter. The latch holding arm 80 is held in position by a latch crank 83, the latter of which is pivotally mounted at 84 and is biased by means of an adjustable spring 85 so that the latch crank 83 with a cooperating pall 86 holds the holding arm 80 in the position shown upon the drawing, or in the latched up position. The spring 85 is adjustable by a threaded adjustor 87 which is effective to change the tension of the spring upon the latch crank as well as rotating an indicator 88 as adjustment is made. The torque arm 52 will be biased by the torque spring 57 against the latch 53 and will stay in this position until the latch is tripped.

The tripping of the apparatus is initiated by the trip arm 69 which has a roller surface 89 which bears against the latch crank 83. The latch crank 83, when the trip arm 69 pushes thereagainst with sufficient force, will rotate and will release the latch holding arm 80, the latter having a roller surface on the end thereof. When the latch holding arm 80 is released, the force of the torque arm 52 bearing down through the nose member 54 upon the latch 53 tends to cause rotation of the latch 53 as well as the holding arm 80 and the trip actuator 81. Upon the release of the latch 53 from the position shown upon the drawings, the torque arm will begin to move to a collapsed position, or in a clockwise direction, as shown in Figure 9, or in a counterclockwise direction as shown in Figure 2.

To consider further the operation explained thus far in connection with the initial tripping of the apparatus, reference should be made to Figure 6 where the apparatus is diagrammatically shown in the mid-position. Assuming that the pressure within the housing 60 is built up to a sufficient value to cause a collapsing of the bellows 62, the trip arm 69 will be rotated in a counterclockwise direction and will operate upon the latch crank 83 in opposition to the biasing spring 85 and move the pall 86 away from the end of the latch member 53, the end in effect corresponding to the latch arm 80. When the latch crank 83 rotates in a counterclockwise direction, the latch 53 will be free to move in the clockwise direction due to the force of the torque arm 52 which has the torque spring 57 acting thereon. When the latch 53 moves out from under the nose member 54, the torque arm 52 will be free to move in a clockwise direction and through the torque arm link 50 will cause a braking torque on the pivot point 48 between the connecting links 44 and 45. The initial breaking force due to this torque arm moving in this direction will present a nearly infinite force because of the fact that the force is acting at right angles upon the connecting links 44 and 45. The torque arm 52 will continue to rotate in a clockwise direction, as shown in Figure 6, until a limiting position has been reached in the apparatus. This limiting position and the manner in which it is reached will be next described.

The apparatus for determining the fixed position upon collapse is shown best in Figures 3, 9, 11, 12, and 13. Rigidly attached to the output arm 46 is a cam stop 90, shown in Figures 3 and 11. This cam stop 90 has a projection 91 extending from the surface thereof with an engaging surface facing in a counterclockwise direction, as viewed in Figures 3 and 11. A dog 92 is arranged for movement into engagement with a cam stop projection 91 when the apparatus is tripped, as shown in Figure 11. The dog 92 is pivotally carried by a support crank 93, the latter of which is pivotally mounted at 94 on the base. A support crank 93 has a pin 95 against which the dog 92 is biased by a spring 96. A projection 97 on dog 92 will engage pin 95 under certain circumstances and limit the movement of the dog. The support crank 93 also carries an adjustable abutment 98, the latter of which is arranged to engage a projection 99 on a pull-link crank 100 which is also pivoted at 94.

The pull-link crank 100 is held in a counterclockwise direction, as viewed in Figure 13, against the biasing action of spring 96, acting through dog 92, support crank 93, abutment 98, and projection 99, by a latch arm 105 which has a notch 106 therein which engages a pin 107. The latch arm 105 is biased in an upward direction by a spring 108 which is adjustable by means of a threaded adjustment 109, shown best in Figure 12. The spring 108 and the adjustment 109 are carried by a plate 110 which also carries the pin 107, said pin being vertically adjustable by means of an eccentric screw assembly 111, also carried by plate 110 and fastened thereto by a pair of screws 112 and 113.

The end of latch arm 105 opposite that where the notch 106 is located is pivoted on the support crank 100 at 115. Also pivotally mounted on the support crank 100 and 115 is a relatching link 116 whose functioning will be discussed below. The relatching link 116 is biased in an upward direction by means of a spring 117 which interconnects latch arm 105 and the link 116. The relatching link 116 is actually a U-shaped channel member with the latch arm 105 mounted therein and extending therethrough from the pivot 115 until the arm passes under a saddle member 118 which covers the link 116 and arm 105. The saddle member 118 is positioned directly under the trip actuator 81, as shown in Figure 9.

It will be recalled that upon the release of the latch holding arm 80, the torque arm 52 acting through nose member 54 causes the latch 53 to rotate clockwise, as viewed in Figure 9. This clockwise movement of latch 53 causes a corresponding movement of the trip actuator 81 so that the actuator projection 82 which is a part thereof will bear down upon the saddle 118 on the relatching link 116. This downward movement of the saddle 118 will cause the link 116 and latch arm 105 to pivot about the pivot 115 and this pivoting will move the pin 107 out of the notch 106 on arm 105. With nothing holding the arm 105 in the position shown upon the drawing, the spring 96, shown in Figure 13, will be effective to rotate the support crank 93 in a clockwise direction and to pull the arm 105 and the link 116 to the right. As the support crank is pulled in a clockwise direction, the dog 92 is moved into engagement with the cam stop 90. As the torque arm collapses, the connecting links 44 and 45 will be broken at 43 and pulled downwardly and when so moving, the output arm 46 rotates in a counterclockwise direction, as viewed in Figure 3, and also rotates the stop 90 until the projection 91 strikes the dog 92. When the stop arm 90 strikes the dog 92, the apparatus will be in the position shown in Figure 11.

Reconsidering the above in the schematic showings of Figures 7 and 8, it will be noted that in Figure 7, the apparatus is in the closed gate position. Upon the release of the latch 53, the torque arm 52 rotates in a clockwise direction due to the force of the torque spring 57 and the links 44 and 45 will be broken. As the output arm 46 rotates in a counterclockwise direction, the cam stop 90 will move into engagement with the dog 92 and will latch the output arm in a predetermined fixed position which may be, for example, the position in which the waste gate 20 will cause the associated turbine to deliver a desired amount of driving energy for the compressor 13, shown in Figure 1. This driving of the compressor is such that there will be an operating pressure which will be safe as far as engine operation is concerned.

The collapsing operation just explained has assumed that the waste gate has been in the closed gate position or in a near closed gate position at the time of the collapse. Under normal circumstances, this is the only time that the linkage will be collapsed due to the operation of the bellows 62. However, in the event that the manual button 75 is depressed to effectively cause a collapsing of the apparatus, this manual button depressing can occur at any time or in any position of the apparatus. If the apparatus is in a position near the closed gate position as assumed above, the apparatus will move to the collapsed position which has been assumed above. In the event that the apparatus is in the near open gate position, and the manual button 75 is depressed, the apparatus will collapse, but in this case, the position to which the linkage will collapse will not be dependent upon the position of the cam stop 90. The reason that it will not be dependent upon the cam stop 90 will be understood from Figure 5 where it is noted that when the apparatus is in the open gate position, the cam stop 90 is below the dog 92 and any collapsing of the apparatus would not cause the stop 90 to engage the dog 92. What happens in this case is that the apparatus will collapse, with the torque arm 52 moving in a clockwise direction, until such time as the torque arm strikes an abutment 120 which is carried by the input arm 43. This abutment is shown in Figure 2, as well as in the schematic showings of Figures 5–8. There will be no movement of the input arm as the arm is connected to the waste gate motor through a gear train which acts as a brake. Also, the waste gate motor may have a brake therein.

For adjusting the relative position of the cam stop 90 with respect to the output arm 46, there is provided an adjustable template 121 having a plurality of offset screw holes therethrough with a screw 122 being placed in a desired screw hole to determine the relative positions between the arm and the stop. As the abutment 120 on the input arm 43 is rigidly attached thereto, the apparatus when tripped from a position wherein the stop 90 will not strike the dog 92, the linkage will always be collapsed to a position which will be dependent upon the position of the input arm 43 and will not be adjustable with respect thereto.

Next to be considered is the relatching mechanism which is effective to put the connecting linkage back to an operating position from the collapsed position. Referring first to Figures 12 and 13, there is shown pivoted at 130, a crank arm 131. This crank arm 131 has a bracket thereon carrying an adjustable screw member 132, the lower end of which engages the latch arm 105. When the pin 107 is in notch 106, the spring 108 pulls the arm 105 in an upward direction and this upward movement causes the arm to strike the screw 132 and rotate the crank arm 131 about the pivot 130. On the opposite side of the pivot 130 on arm 131 is a projection 133 which is arranged to strike the pull link 146 and force it downwardly against the biasing action of spring 117. This pull link has in the end thereof a rack 134, shown also in Figure 13. This rack, when the link is biased downwardly, as shown, is out of engagement with a ratchet gear 135. This ratchet gear is arranged to be driven by a sector gear 136 which is connected to the input arm 43.

Upon the trip actuator 81 forcing the arm 105 and link 116 downwardly, the arm 105 and link 116 will move to the right, as viewed in Figure 9, and the rack 134 will be maintained out of engagement with the ratchet gear 136 until the stop cam 91 strikes the dog 92. As soon as the nose member 54 has cleared the latch 53, the latch is free to rotate back to the position shown in the drawings and the pall 86, which is biased by spring 85, will force the holding arm 80 back into a holding position. When the latch 53 moves back, the trip actuator 81 will move back and the arm 105 and link 116 will move upwardly so that now the rack 134 carried by the link 116 will engage the ratchet gear 135.

To initiate the relatching movement, it is necessary to move the input arm 43 or the shaft 42 in a waste gate opening direction, or as viewed in Figure 9, the sector gear 136 will be rotated in a counterclockwise direction by the input arm. The initial movement of this sector gear 136 will cause a corresponding rotation of the ratchet 135 and the rack 134 so that the rack 134 will move to the left and pull with it the pivot point 115. Refer now to Figure 11, where the relatching movement of the link 116 will cause movement of the pivot point 115 to the left, or counterclockwise direction. This movement to the left will cause the support crank 100 acting through projection 99 and the adjustable abutment 98 carried by the support crank 93 to rotate the support crank 93. As the torque spring 57 is acting with considerable force upon the linkage in the collapsed position, the cam stop 91 will be forced against the dog 92 with considerable force. In order to move the dog 92 away from this position, the support crank 93 in rotating counterclockwise will cause the pivot 137 which carries the dog 92 to move counterclockwise and to rotate the dog 92 about a point where the dog 92 engages the cam stop 91 so that in effect, the dog 92 will be rotating in a clockwise direction about a point on the cam stop. This rotative movement of the dog 92 effects an easy breaking away of the dog from the cam stop 91 and requires a minimum of breaking force.

As soon as the dog 92 is moved out from under the stop 91, the linkage will collapse even further. This additional collapsing will continue until the torque arm 52 strikes the abutment 120 which is carried by the input arm 43. This is best shown in the diagrammatic showing of Figures 5–8. Continued movement of the input arm 43 in a waste gate opening direction, or as viewed in the schematic showing of Figures 5–8, and in a counterclockwise direction, will cause the abutment 120 to act upon the torque arm 52 and will force the same in a counterclockwise direction. The linkage will continue to move back to its operating position and as soon as the nose member 54 carried by the torque arm 52 strikes the latch 53, the nose piece will rotate and allow the torque arm to move to the operating position. The torque arm will reach the operating position upon the input arm 43 being moved to the wide open gate position, as shown in Figure 5.

As soon as the apparatus has been rotated back to the near open gate position, the rack 134 will be forced out of engagement with the ratchet 135 by the operation of the crank arm 131 and the pin 107 moving into notch 106, as explained in connection with Figures 12 and 13. When the rack is moved out of engagement with the ratchet 135, the apparatus will be ready for another collapsing operation upon the occurrence of an excessive intake manifold pressure or upon actuation of the collapsing mechanism by the depressing of the manual button 75.

From the foregoing it will be understood there has been provided an improved collapsible linkage apparatus which will render inoperative a driving connection between a driven arm and a driving arm with the driven arm being forced into a predetermined position where it is stopped by means actuated by the latching mechanism upon the collapse of the linkage following release of the latching mechanism. Further, there has been provided a resetting assembly driven by the driving arm which requires less resetting force than is exerted by the collapsing force of the apparatus upon the driving connection. Inasmuch as many modifications will be obvious to those skilled in the art, it is to be understood that the scope of the invention is to be limited solely by the appended claims.

I claim as my invention:

1. A safety apparatus, comprising in combination, a load device to be positioned, said load device comprising a shaft having an output arm connected thereto, a cam stop mounted on said shaft, angular positioning means including said shaft and said cam stop for selectively fixing the angular positioning of said cam stop with respect to said shaft, motor means for driving said load device, a linkage system including said output arm for connecting said motor means and said load device, said linkage system comprising a collapsible structure of members, latching means for holding said linkage structure in a predetermined position, a torque spring for biasing said linkage structure toward a collapsed position, pressure responsive tripping means, said responsive means rendering said latching means ineffective so that said linkage system will collapse, a dog for engaging said cam stop, said dog being operated by said tripping means, and relatching means comprising said motor means for restoring said linkage system to said predetermined position.

2. A control apparatus, comprising in combination, a load device to be selectively positioned, motor means for driving said load device, said motor means having a shaft with an output lever attached thereto, a collapsible linkage system comprising a torque arm pivotally supported at one end thereof on said shaft, said linkage system connecting said load device and said motor means, latch means comprising a member pivoted about a fixed point and having two projecting arms, one of said arms supporting said torque arm and said linkage system, pressure responsive releasing means for holding the other of said arms, said releasing means upon releasing the other said arms effectively removing the support from said torque arm to render said linkage system ineffective.

3. A mechanical apparatus, comprising, a driven shaft, a driving shaft for selectively positioning said driven shaft, a collapsible linkage system connecting said driven shaft and said driving shaft, said system comprising a torque arm pivotally supported at one end thereof on said driving shaft, and a nose member being pivotally mounted on the other end of said torque arm, resilient means biasing said torque arm about said driving shaft, and latching means holding said torque arm in an operative position, said latch means being pivotally supported and having a projecting member attached thereto, said member having a beveled surface coming into engagement with said nose member providing a biasing force through said torque means tending to rotate said latching means from the supporting position so that said torque arm can move to an inoperative position.

4. A mechanical apparatus, comprising, a driven shaft having a stop arm attached thereto, a driving shaft, a collapsible linkage connecting said driving shaft and said driven shaft, means normally preventing collapse of said linkage, a torque spring, said spring providing a biasing torque to said linkage tending to cause a collapsing rotation thereof about said driving shaft, and a selectively positioned stop dog, said dog contacting said stop arm to stop said driven shaft at a predetermined position on the collapse of said linkage and thereby limit the collapse of said linkage.

5. A control apparatus, comprising, a load device, a driving shaft for driving said load device, a linkage system connecting said load device and said driving shaft, said system comprising a torque arm, biasing means providing a rotational biasing force to said torque arm, said torque arm having a flexible member attached to one end thereof, a latch device, said device being pivoted about a fixed point and having two projecting arms, one of said arms having an end contacting said flexible member to support said torque arm in an operative position, tripping means for releasing said latch device having an output arm thereon, a crank, said crank being pivotally supported and spring biased for rotational movement about a fixed point, a pawl having a camming surface connected to said crank, said crank and pawl providing a holding pocket for the end of the other of said projecting arms of said latch device and biased thereagainst, means including said tripping means for releasing said end from said holding pocket, and means including said camming surface forcing said end into said holding pocket when said latch device has released said torque arm.

6. A collapsible linkage apparatus comprising, a driving member and a driven member, a pair of connecting links connected between said members and pivotally joined at all points of connection to form a parallelogram linkage, supporting means for supporting a pivotal connection between said connecting links and being arranged for pivotal movement, biasing means acting upon said supporting means tending to cause said supporting means to move to a non-supporting position, a pivoted stop member, said pivoted stop member latching said supporting means in said supporting position, and tripping means for rotationally releasing said stop member from its latching position.

7. A collapsible linkage apparatus comprising, a driving member and a driven member, a pair of connecting links connected between said members and pivotally joined at all points of connection to form a parallelogram linkage, supporting means for supporting a pivotal connection between said connecting links and being arranged for pivotal movement, biasing means acting upon said supporting means tending to cause said supporting means to move to a non-supporting position, a pivoted stop member having a camming surface engaging said supporting means and latching said supporting means in an operative position, and tripping means for releasing said stop member from its latching position so that said supporting means will operate upon said camming surface and cause rotational movement of said stop member.

8. A collapsible linkage apparatus comprising, a driving member and a driven member, a pair of connecting links pivotally connected together and between said driving member and said driven member, said connecting links having an operative and an inoperative position, a pivoted supporting member connected to the pivotal connection between said connecting links, biasing means acting upon said supporting means tending to cause said supporting means to move to a non-supporting position, a pivoted stop member having a camming surface engaging said supporting member and latching said supporting member in an operative position, tripping means operative upon said stop member to release said supporting member from said operative position, said supporting member operating upon said stop member to cause rotational movement of said stop member upon actuation of said tripping means, a stop arm carried by said driven member, a movable abutment, and means actuated by the rotational movement of said stop member for moving said abutment into engagement with said stop arm to lock said driven member in a predetermined fixed inoperative position.

9. A collapsible linkage apparatus comprising, a driving member and a driven member, a pair of connecting links pivotally connected together and between said driving member and said driven member, said connecting links having an operative and inoperative position, a pivoted supporting member connected to the pivotal connection between said connecting links, biasing means acting upon said supporting means tending to cause said supporting means to move to a non-supporting position, a pivoted stop member having a camming surface engaging said supporting member and latching said supporting member in an operative position, tripping means operative upon said stop member to release said supporting member from said operative position, said supporting member operating upon said stop member to cause rotational movement of said stop member upon actuation of said tripping means, a stop arm carried by said driven member, a biased abutment, means latching said abutment in a fixed position, and means actuated by the rotational movement of said stop member for releasing said last named latching means so that said abutment will move into engagement with said stop arm to lock said driven member in a predetermined fixed inoperative position.

10. A collapsible linkage apparatus, comprising, a driving member and a driven member, a pair of connecting links pivotally connecting said members, biasing means connected to said links tending to move said links to an ineffective position and cause said driven member to assume a predetermined position, a latch member for maintaining said links in an operative position, a stop arm carried by said driven member, a movable abutment, tripping means for releasing said member, and means including said latch member for causing said abutment to engage said stop arm when said latch member is released.

11. A collapsible linkage apparatus comprising, a driving member and a driven member, a pair of connecting links pivotally connecting said driving and driven members, biasing means connected to said links tending to move said links to an ineffective position and cause said driving member to assume a predetermined position, a latch member for maintaining said links in an operative position, a stop arm carried by said driven member, a movable abutment, tripping means for releasing said latch member, means including said latch member for moving said abutment to engage said stop arm when said latch member is released, and means driven by said driving member from moving said abutment from engagement with said stop arm.

12. A collapsible linkage apparatus comprising, a driving member and a driven member, a pair of connecting links pivotally connecting said members, biasing means connected to said links tending to move said links to an ineffective position and cause said driven member to assume a predetermined position, a latch member for maintaining said links in an operative position, a stop arm carried by said driven member, a movable abutment, tripping means for releasing said latch member, means including said latch member for causing said abutment to engage said stop arm when said latch member is released, means driven by said driving member for moving said abutment from engagement with said stop arm, and means including said driving member driving against said biasing means to move said links to an operative position so that said latch member may maintain said links in an operative position.

13. A collapsible linkage apparatus comprising, a driving member and a driven member, a pair of connecting links pivotally connecting said members, biasing means connected to said links tending to move said links to an ineffective position and cause said driven member to assume a predetermined position, a latch member for maintaining said links in an operative position, a stop arm carried by said driven member, a movable abutment comprising a first pivoted member carrying a second pivoted member having a resilient biasing means for maintaining said second member in a fixed position with respect to said first member, a tripping means for releasing said latch member, means including said latch member when tripped for moving said abutment into engagement with said stop arm, said first named biasing means rigidly holding said stop arm in engagement with said abutment, and means driven by said driving member for moving said abutment from engagement with said stop arm, said means comprising a bell crank which drives said first member against the biasing action of said first and second named biasing means and effects rotation of said second member with respect to said first member to break the force of said arm acting on said abutment with a minimum of effort.

References Cited in the file of this patent

UNITED STATES PATENTS

| | | |
|---|---|---|
| 2,218,606 | Foster | Oct. 22, 1940 |
| 2,486,369 | Goss | Oct. 25, 1949 |
| 2,561,618 | Foster | July 24, 1951 |
| 2,574,137 | Zenner | Nov. 6, 1951 |